US007097193B1

(12) United States Patent
Sievert

(10) Patent No.: US 7,097,193 B1
(45) Date of Patent: Aug. 29, 2006

(54) GOOSENECK TRAILER HITCH AND METHOD

(76) Inventor: Ronald Sievert, P.O. Box 56, Jasper, MN (US) 56144

( * ) Notice: Subject to any disclaimer, the term of this patent is extended or adjusted under 35 U.S.C. 154(b) by 108 days.

(21) Appl. No.: 10/964,326

(22) Filed: Oct. 13, 2004

(51) Int. Cl.
   *B62D 53/06* (2006.01)
(52) U.S. Cl. .............................. 280/441.2; 280/438.1; 280/477; 280/478.1; 280/479.2
(58) Field of Classification Search ............ 280/438.1, 280/441.2, 477, 478.1, 479.2
   See application file for complete search history.

(56) References Cited

U.S. PATENT DOCUMENTS

| 4,429,895 A | 2/1984 | Hunter |
| 4,433,853 A | 2/1984 | Swaim |
| 4,576,395 A | 3/1986 | Longoria |
| 4,685,695 A | 8/1987 | LeVee |
| 5,482,309 A | 1/1996 | Hollis |
| 5,868,415 A * | 2/1999 | Van Vleet ................... 280/483 |
| 6,142,500 A | 11/2000 | Sargent |
| 6,186,532 B1 | 2/2001 | Ray et al. |
| 6,234,509 B1 | 5/2001 | Lara |
| 6,264,229 B1 | 7/2001 | Gill et al. |
| 6,808,195 B1 * | 10/2004 | Smith ....................... 280/417.1 |
| 6,854,757 B1 * | 2/2005 | Rehme ....................... 280/488 |

* cited by examiner

*Primary Examiner*—Lesley D. Morris
*Assistant Examiner*—Marc A. Scharich

(57) ABSTRACT

The gooseneck trailer hitch assembly includes a block tube that is fixed to a trailer frame. A top plate is fixed to the block tube. A vertical shaft is connected to the top plate. A steel spherical member is slidably mounted on the vertical shaft. Two rings are clamped to the spherical member and pivotable about the spherical member center. A tower assembly tube receives on of the two rings and is fixed to the rings. A tube positioning member is fixed to the tower assembly. The positioning member includes a wedge surface that contacts a steel ring and moves the tower assembly tube toward a vertical position as the spherical member is moved toward to the top plate. The positioning member also includes a cylindrical surface that engages the steel ring after the tower assembly tube is vertical. A vibration and force damper is provided between the steel ring and the block tube.

10 Claims, 10 Drawing Sheets

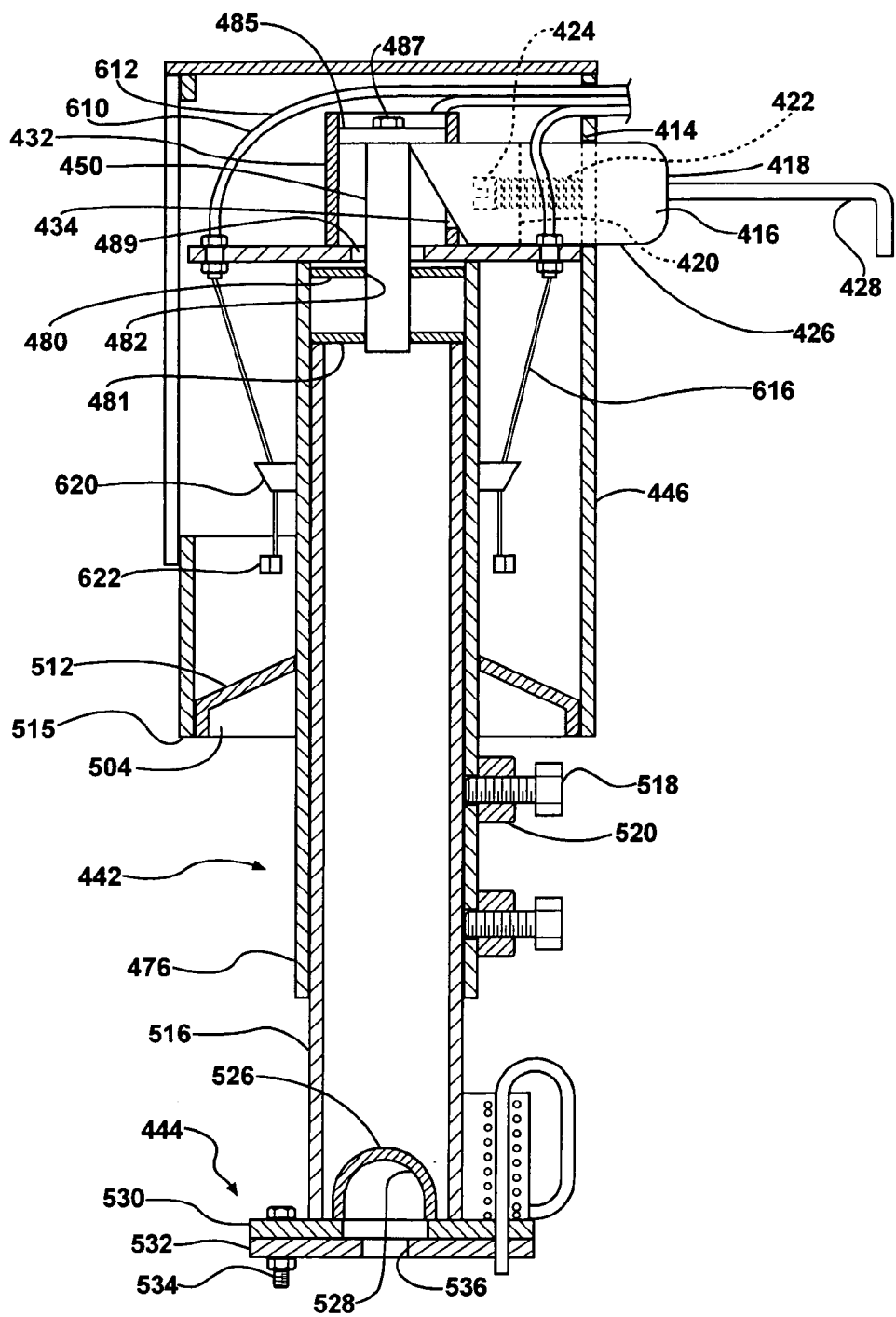
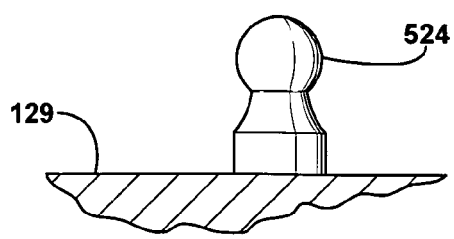
FIG - 3

GOOSENECK TRAILER HITCH AND METHOD

FIELD OF THE INVENTION

The gooseneck trailer hitch permits a hitch connector assembly on the trailer to be moved relative to the trailer and into vertical alignment with a connector assembly component on a tow vehicle to facilitate the connection of a gooseneck trailer to a tow vehicle.

BACKGROUND OF THE INVENTION

Conventional ball and socket hitches, on light trucks, for pulling trailers add weight to the truck rear axle and reduce weight on the front axle. Side loads on the trailer are transferred through the rear hitch ball on the truck and tend to force the steered front wheels on the truck to one side or the other. Hitch weight must be limited for some trailers to be pulled by light trucks.

Gooseneck trailers move the pivot point forward relative to a truck rear axle where more weight can be transferred to the truck, weight distribution on the truck is improved and the trailer effect on the truck steering is minimized when compared to a rear mounted hitch on the truck. These advantages make it possible to pull a heavier gooseneck trailer or carry more cargo on a trailer pulled with a truck than could be pulled with the same truck using a rear mounted ball hitch.

Alignment of a truck with a gooseneck trailer when connecting the trailer to a truck can be somewhat difficult. The driver of the truck may not be able to see the hitch component attached to the truck due to the vehicle configuration or other cargo carried by the truck.

Gooseneck trailers tend to be larger due to their ability to haul more cargo when pulled by trucks with a given cargo capacity and the fact that such trailers may have two or three axles. As a result of trailer size and weight, it is difficult to obtain alignment of truck and trailer connector assemblies. Experienced drivers can generally align a truck with a trailer and position the truck mounted connector within about a foot or less of horizontal alignment with a trailer mounted connector. With a person on the ground guiding a truck and truck driver, it is possible to reduce horizontal misalignment between truck and trailer connector components to six inches or less. Where one of the connector components is a two inch diameter ball, horizontal alignment must be within about two inches. Obtaining such alignment can be difficult even when using a second person as a guide.

Construction standards for hitch couplers connecting a trailer or other component to a towing vehicle vary substantially depending upon a number of factors. Trucks pulling trailers weighing more than 2,000 pounds at highway speeds generally have components that have little or no relative horizontal movement between components. If there is relative movement the loads that occur when the truck brakes are applied or the trailer brakes are applied after the truck has slowed can result in substantial impact forces. These forces will cause wear and may lead to hitch failures. Hitches with ball and ball socket connectors generally eliminate impact forces if there is sufficient weight forcing the ball into the socket, the ball is clamped securely into place and the ball socket is clamped securely or welded into place.

SUMMARY OF THE INVENTION

The gooseneck trailer hitch assembly includes a hitch mounting block. The hitch mounting block includes a block tube, with a vertical central axis. The block tube is adapted to be connected to a trailer hitch support frame. A top plate is fixed to the block tube; a vertical shaft is connected to the top plate and is coaxial with the block tube. A hard rubber band is mounted in a lower end of the block tube. The hard rubber band in a lower end of the block tube is coaxial with the vertical shaft. A steel ring is mounted inside the hard rubber band in a position coaxial with and separated from the block tube. A tower assembly includes a steel spherical member slidably mounted on the vertical shaft of the block tube. An upper ring with an upper ring aperture that has a smaller diameter than the steel spherical member and a flanged ring with a central ring aperture that is also smaller in diameter than the steel spherical member are clamped together and to the steel spherical member by a plurality of bolts. A tower assembly tube has an upper end that is fixed to the upper ring. The tower assembly tube and the upper ring are pivotable about the spherical member. A tube positioning member is fixed to the tower assembly tube. The tube positioning member has a wedge surface that contacts the steel ring as the tower assembly tube moves toward the top plate. The tube assembly also has a tube positioning surface that is generally parallel to a tube axis. The tube positioning surface engages a ring radially inner surface on the steel ring in response to movement of the tower assembly tube toward the top plate after the tube axis is generally coaxial with the vertical shaft. The hitch connector assembly is connected to the tower assembly tube.

The tube positioning member can include a plurality of plates with wedge surfaces and positioning member can also include a conical member with a conical wedge surface that is coaxial with the tower assembly tube.

BRIEF DESCRIPTION OF THE DRAWINGS

These and other objects, features and advantages will become more readily apparent in view of the following detailed description and best mode, appended claims and accompanying drawings, in which:

FIG. 3 is a vertical sectional view, similar to FIG. 2, with the mast assembly in a raised working position;

DETAILED DESCRIPTION OF THE PREFERRED EMBODIMENTS

Figure 8:
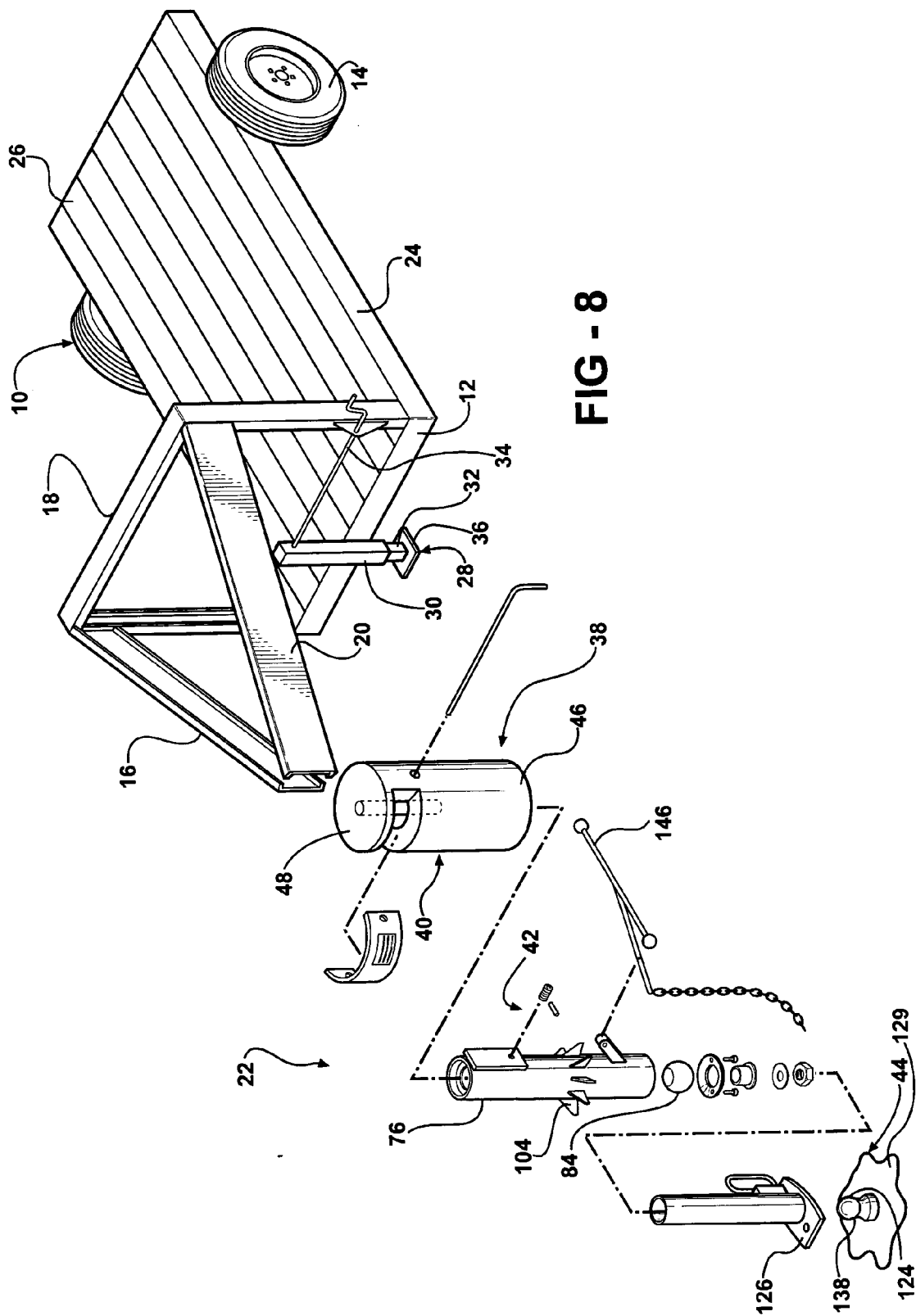
FIG. 8 is an expanded view, similar to FIG. 5, with a modified mast assembly.

A gooseneck trailer 10, as shown in FIG. 8, includes a frame 12 supported by an axle, wheel and tire assembly 14. A gooseneck 16 is attached to the front portion of the frame 12. The gooseneck 16, which is an integral part of frame 12, included a vertical mast 18 and a horizontal hitch support frame 20. The hitch support frame 20 attached to the upper portion of the mast 18 and extends forward from the mast. Goosenecks that are currently in use on trailers have a number of different configurations all of which have a hitch assembly 22 mounted on their forward end in a position raised from the main frame portion 24 extending rearward from the lower portion of the mast. A cargo carrying bed 26 may be attached to the main frame portion 24. If the trailer 10 is an enclosed van type trailer the side walls may form a portion of the mast 18. A lower front wall of the enclosure may also form a portion of the mast 18. The hitch support frame 20 of the gooseneck 16 may also include an upper cargo support bed. A landing gear 28 supports the front of the trailer 10 when the trailer is not attached to a truck or other towing vehicle. The landing gear 28 as shown includes a tubular screw housing 30, a rod 32 telescopically received in the housing and a crank 34. The crank 34 is turned to extend or retract the rod 32 and extend or retract a ground plate 36 secured to the rod 32. The landing gear 28 raises or lowers the gooseneck 16 as required to connect or disconnect the trailer 10 to or from a truck.

Figure 9:
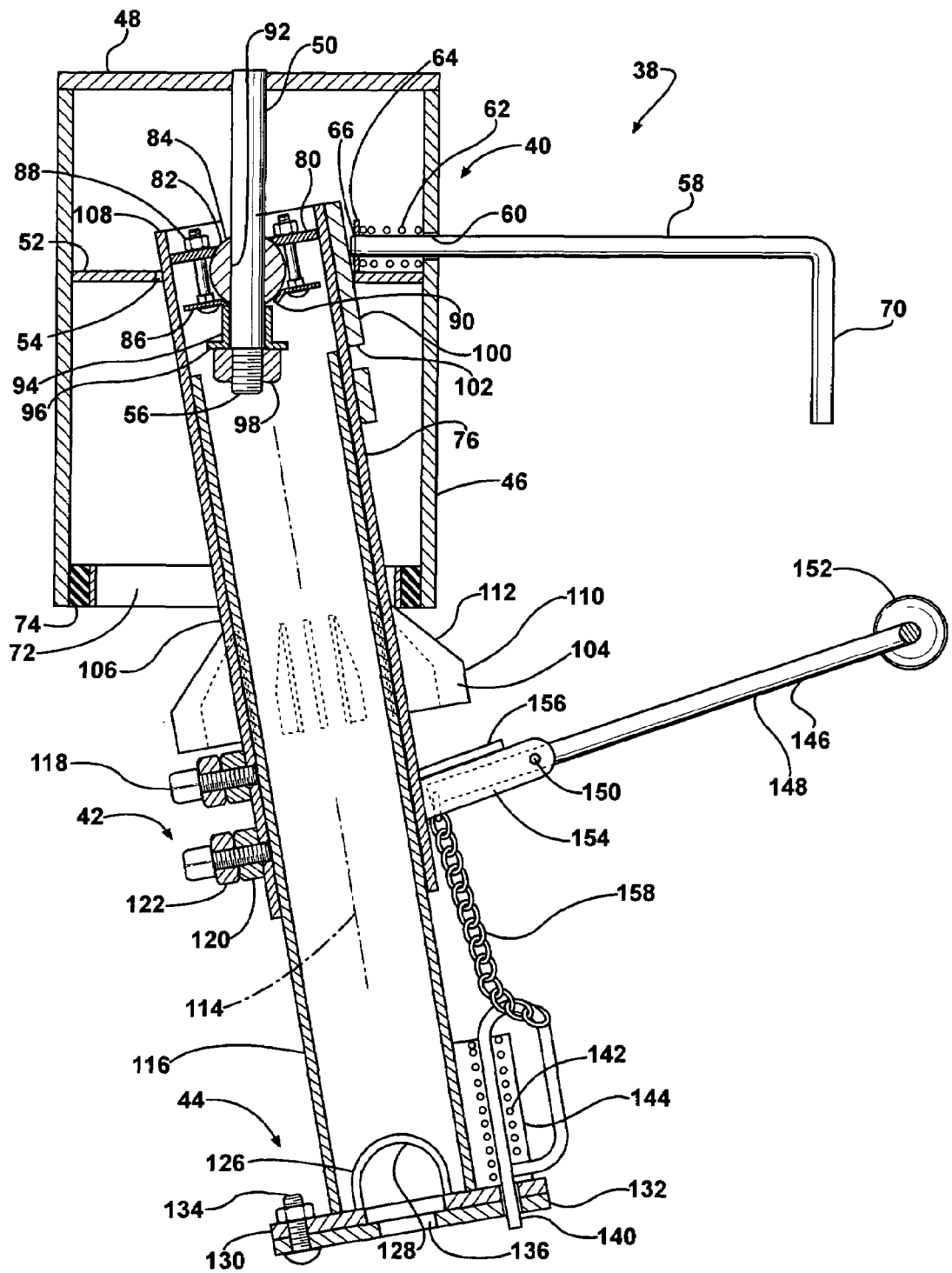
FIG. 9 is a vertical sectional view, similar to FIG. 6, with a modified mast assembly in a lowered and tilted position.

The gooseneck trailer hitch assembly 38 as shown in FIGS. 8 and 9 includes a hitch mounting block 40, a tower assembly 42 and a connector assembly 44. The hitch mounting block 40, as shown in the drawing is a steel block tube 46. A top plate 48 closes the top of the tube 46 and is secured to the tube. A vertical shaft 50 is fixed to the top plate 48 and extends downward from the plate. The shaft 50 is coaxial with the tube 46.

A lock plate 52 with a large central aperture 54 is fixed to the inside of the tube 46 in a position spaced from and parallel to the top plate 48. The vertical shaft 50 extends downward through the central aperture 54. The lower end 56 of the vertical shaft 50 is well below the lock plate 52. A lock lever 58 extends through a lever bore 60 through the block tube 46 and radically toward the vertical shaft 50. A coiled compression spring 62 encircles the lock lever 58 inside the block tube 46 and is retrained on the lock lever by a washer 64 and a steel hairpin 66. The compression spring 62 urges the inboard end 68 of the lock lever 58 toward the center of the block tube 46. The washer 64 is in sliding contact with an upper surface of the lock plate 52. A handle 70 is provided on the outboard end to the lock lever 58.

A steel ring 72 is cylindrical and coaxial with the vertical shaft 50. The ring 72 is secured to the tube 46 by a hard rubber band 74. The band 74 functions as a shock absorber and vibration isolator. The rubber band 74 can be replaced by leaf springs or an inflatable donut shaped member, or coil springs that permits limited horizontal movement between the ring 72 and the tube 46.

The tower assembly 42 includes an upper tube 76. An upper ring 80 with a central aperture 82 is fixed inside the upper end of the tube 76. A steel spherical member 84 is slidably held in the aperture 82 by a flanged ring 86 by a plurality of bolts 88. The flanged ring 86 has a central aperture 90 that is about the same diameter as the central aperture 82. The diameter of the spherical member 84 is somewhat larger than the central aperture 82 through the upper ring 80 and the central aperture 90 through the flanged ring 86. Tension on the bolts 88 controls the force required to pivot the spherical member 84 relative to the upper tube 76. A bore 92 through the center of the spherical member 84 receives the shaft 50. The spherical member 84 slides vertically on the shaft 50. A bushing 94 with flange 96 and a nut 98 on the lower end 56 retain the spherical member 84 on the shaft 50 and limit downward movement of the upper tube 76.

Figure 10:
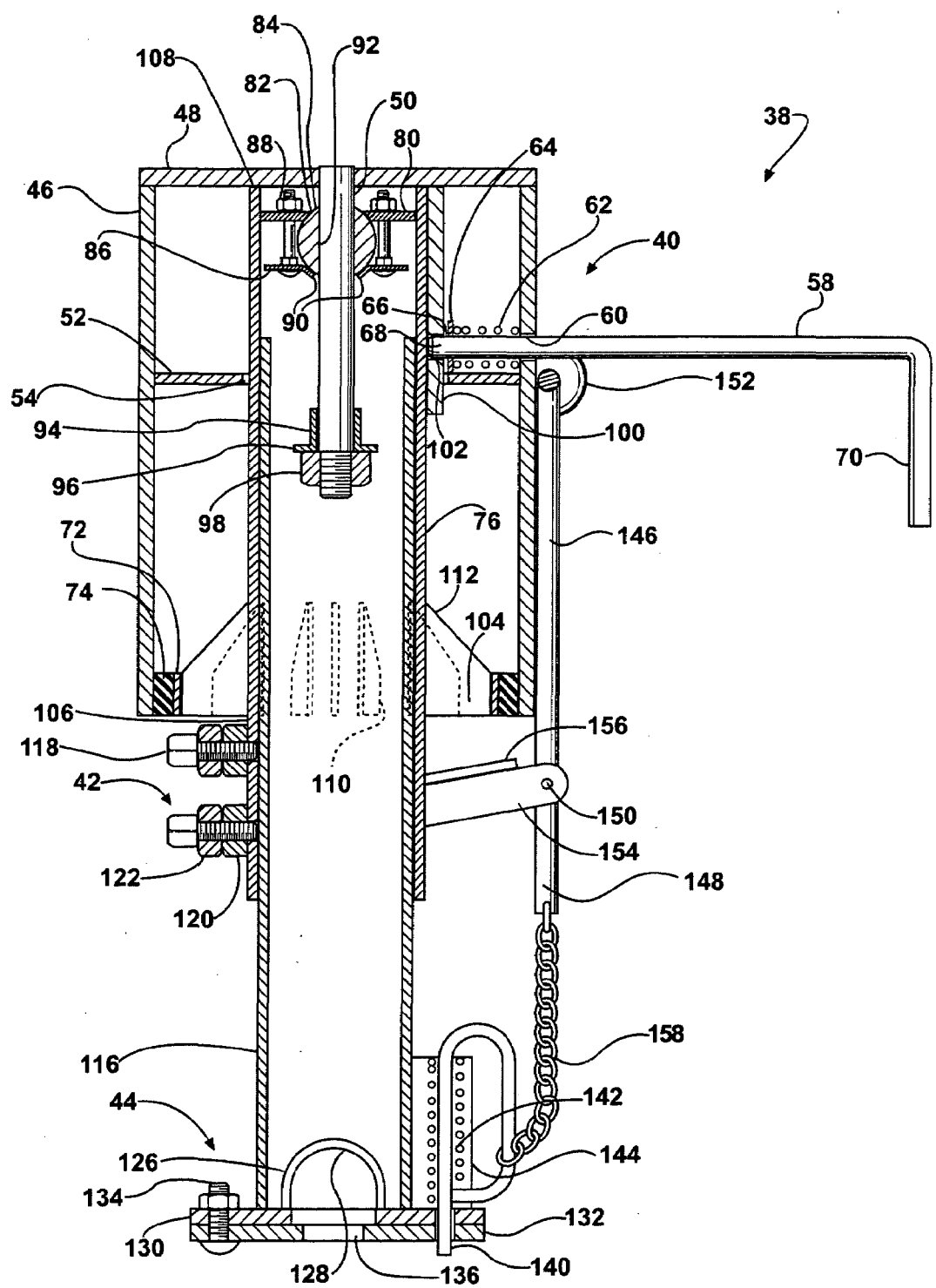
FIG. 10 is a vertical sectional view, of the gooseneck hitch assembly of FIG. 9, with the assembly tower in a raised into a working position.

An accurate plate 100 with a slot 102 partially encircles the upper end of the tube 76. A portion of the central aperture 54 through the lock plate 52 includes a slot that receives the plate 100 and limits pivotal movement of the tube 76 about the axis of the shaft 50. An end of the lock lever 58 extends into the slot 102 to axial lock the tube 76 in an upper position relative to the tube block 46 as shown in FIG. 10.

A plurality of radically extending fins 104 are welded to an outside surface 106 of the tube 76. The fins are welded to the tube 76 in a location spaced well below the upper end 108 of the tube 76. Each fin 104 has a tube positioning surface 110 and a wedge surface 112. The positioning surfaces 110 are generally parallel to the tube axis 114. The wedge surface 112 extends axially upward and radically inward from the positioning surface 110 to the outside surface 110 contact the inside of the steel ring 72 when the upper tube 76 is in a raised position as shown in FIG. 10. There must be a little space between some of the positioning surfaces 110 on the fins 104 and the ring 72. If there is not some space, the fins 104 will not be able to move into the ring 72 and into the position shown in FIG. 10. If there is insufficient clearance between the ring 72 and the positioning surfaces 110 the upper tube 76 may become stuck in the raised position. Too much clearance between the positioning surfaces 110 and the ring 72, when the upper tube 76 is in the raised position, will result in high impact loads during use of the gooseneck trailer 10 and may, over time, damage or even destroy the hitch assembly 38.

The lower portion of the tower assembly 42 includes a lower tube 116 that is telescopically received in the upper tube 76. Setscrews 118 screw into nuts 120 fixed to the outside surface 106 of the tube 76, through tube bores and engage the lower tube 116 to fix the length of the tower assembly 42. Lock nuts 122 maintain the length of the tower assembly 42 and keep the length of the tower from changing during use by holding the setscrews 118 from rotating. Changing the length of the tower assembly 42 adjusts the height of the trailer forward end to maintain the cargo carrying bed 26 nearly horizontal from front to rear when changing from one tow truck to another with a different hitch height.

The connector assembly 44, as shown in the drawing includes a hitch connector ball 124 and a ball receiver 126. The ball 124 is clamped to a truck frame 129. The ball 124 is generally in the lateral center of the truck. Mounting the ball 124 directly over the rear axle if there is one rear axle and mid way between two rear axles will minimize trailer induced forces on a front steered axle. However, moving the ball 124 forward from the position directly over the rear axle will transfer some load from the rear axle or axles to the front steered axle. This shifting of the hitch ball 124 to the front a short distance will generally provide a more stable combination vehicle and may permit an increased trailer or cargo weight. The ball receiver 126 includes a semi spherical recess 128 in a mounting plate 130. The mounting plate 130 is fixed to the lower tube 116. Ball receivers 126 are designed to receive a ball 124 with a specific diameter. A larger ball 124 will not enter the receiver 126. Smaller balls 124 should not be used. A ball retainer plate 132 is pivotally attached to the mounting plate 130 by a bolt 134. A slot 136 in one side of the retainer plate 132 receives a portion of the ball shank 138 and prevents withdrawal of the ball 124 from the ball receiver 126. The scissor type retainer plate 132 is held in a closed position by a pin 140 urged downward by a spring 142. The spring 142 is mounted in a spring housing 144.

A joy stick 146 includes a long rod 148 with a pivot pin 150 and a handle 152. The pivot pin 150 is received in a pivot pin bore through a rigid post 154 fixed to the upper tube 76. A short bar 156 is fixed to the upper tube 76 on the opposite side of the long rod 148 from the post 154. The short bar 156 hold the pivot pin 150 in the rigid post 154 when the joy stick 146 is in the position shown in FIG. 9. When the joystick 146 is pivoted to a position in which the long rod 148 is substantially vertical, the short bar 156 provides clearance for separating the pivot pin 150 from the rigid post 154.

The handle 152 is moved manually downward to pivot the joystick 146, tension the chain 158 and lift the pin 140 from the retainer plate 132. The retainer plate 132 is then pivoted about the bolt 134 to release the hitch ball 124 or open the recess 128. If the connector assembly 44 is being connected, the handle 152 is then moved to pivot the tower assembly 42 about the spherical member 84 and move the recess 128 in the ball receiver 126 into vertical alignment with hitch ball 124. The ball receiver 128 is then lowered by the landing gear 28 until the hitch ball 124 is received in the recess 128. The ball retainer plate 132 is pivoted to a locked position and the spring 142 is released to move the pin 140 into a bore in the retainer plate and thereby lock the hitch ball 124 in the recess 128. Continued lowering the gooseneck 16 with the landing gear moves the spherical member 84 up the shaft 50 and moves the wedge surface 112 into engagement with the ring 72 held by the block 46. The weight of the trailer and the cargo causes the tower assembly 42 to rotate slightly until two wedge surfaces 112 are in engagement with the ring 72 thereby reducing the load on each wedge surface 112 to about half of the total force on the ring. Continued lowering of the front of the trailer 10 moves the trailer gooseneck 16 into alignment with the hitch ball. The force exerted by the wedge surfaces 112 move the trailer 10 or the hitch ball until the tube position surfaces 110 are received in the ring 72 and the upper end 108 of the tube 76 contacts the top plate 48. The spring 62 forces the lock lever 58 into the slot 102 and locks the tower assembly 42 in a generally vertical position. Continued retraction of the rod 32 of the landing gear 28 lifts the ground plate 36 well above the ground and the trailer is ready to be pulled down the road.

The connector assembly 44 described above is one of several connector assemblies that can be used. The pivoted ball retainer plate 132 could, for example, be replaced by a sliding plate or by a retainer pin that is slidable in and out of engagement with the lower half of the ball 124. The heavy duty universal joint could replace the entire ball 124 and ball receiver 126.

Figure 5:
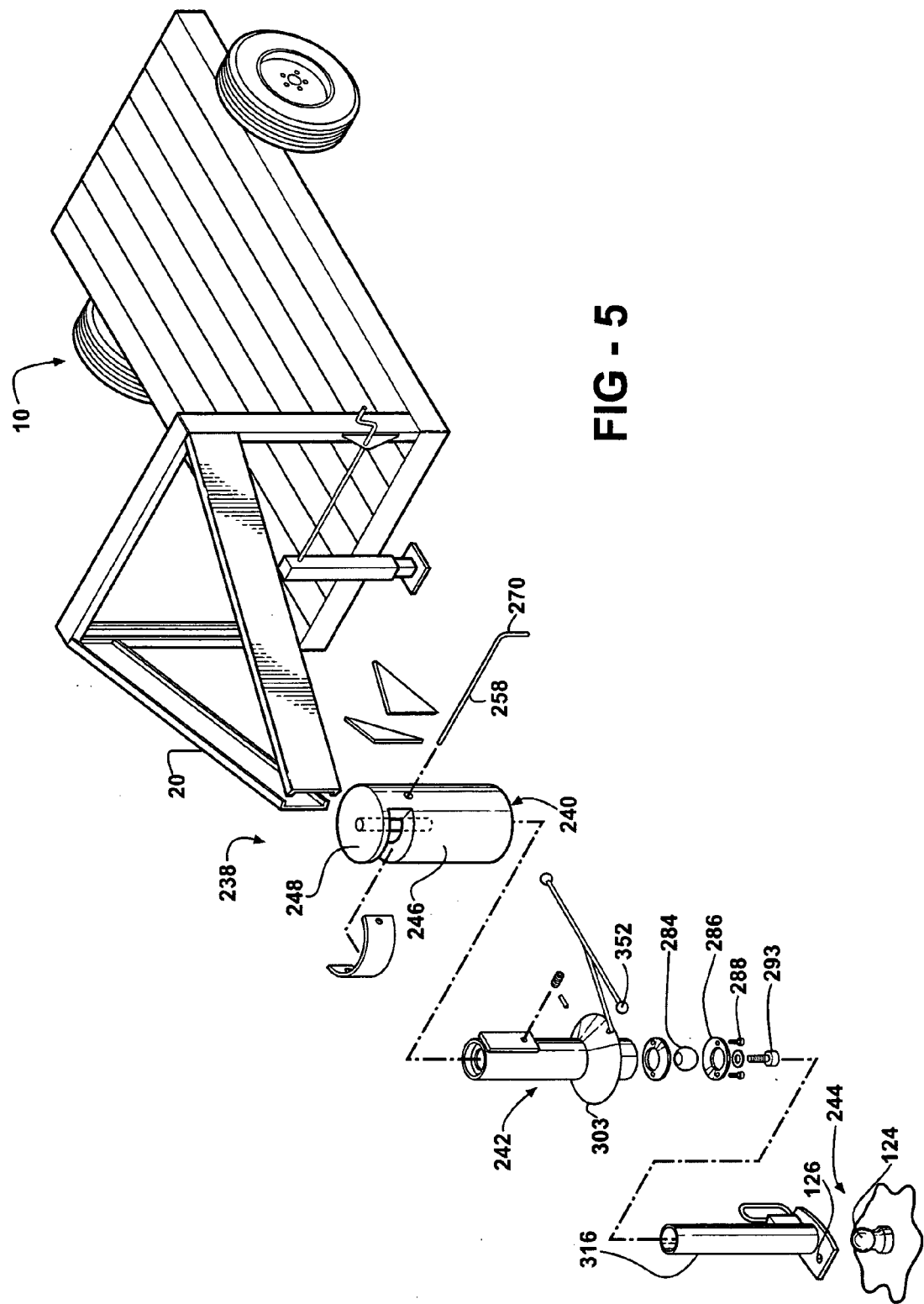
FIG. 5 is an expanded view of the gooseneck trailer hitch and a trailer.
Figure 6:
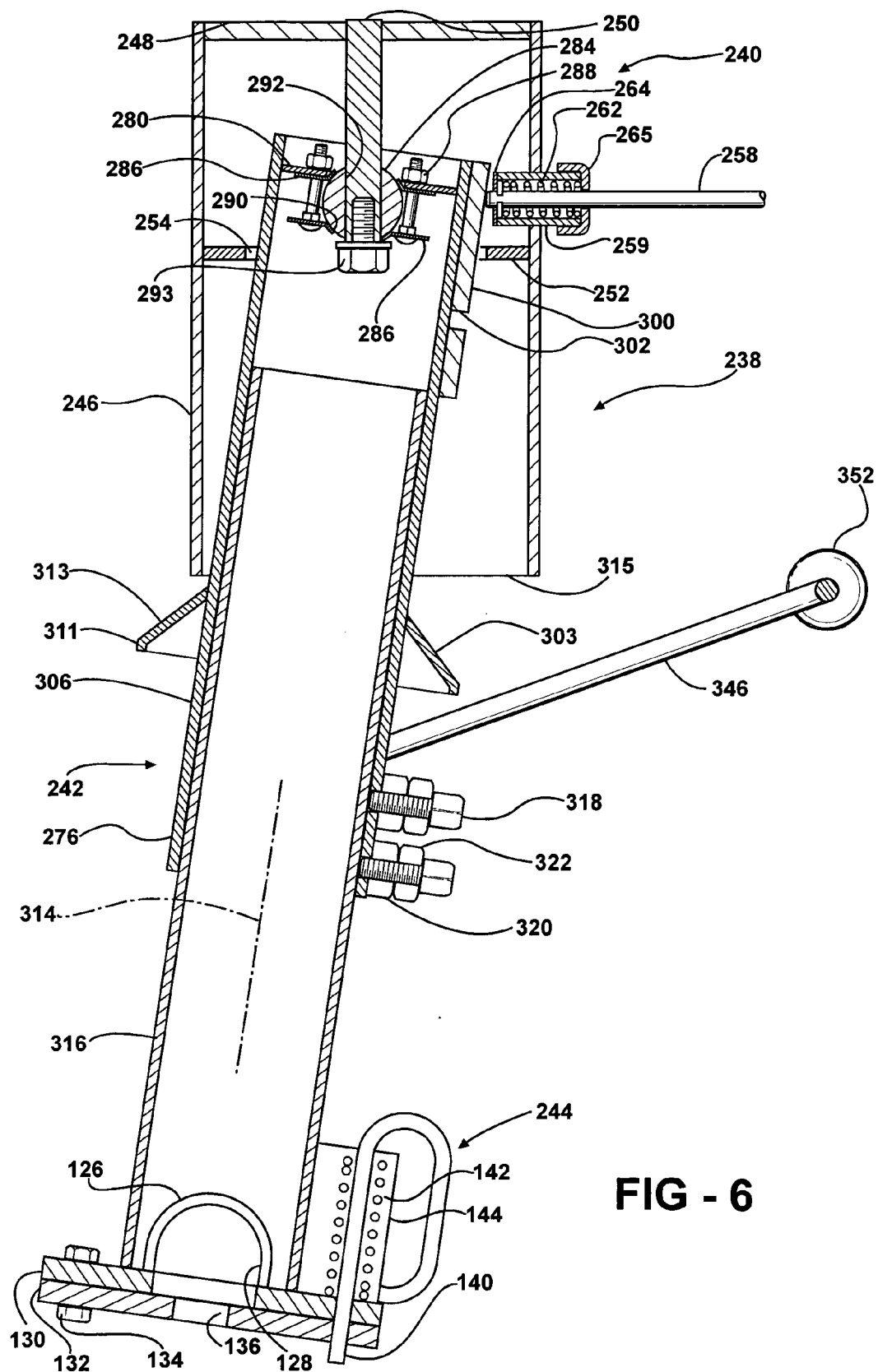
FIG. 6 is a vertical sectional view of the gooseneck trailer hitch with the mast assembly lowered and pivotally supported by a spherical member.
Figure 7:
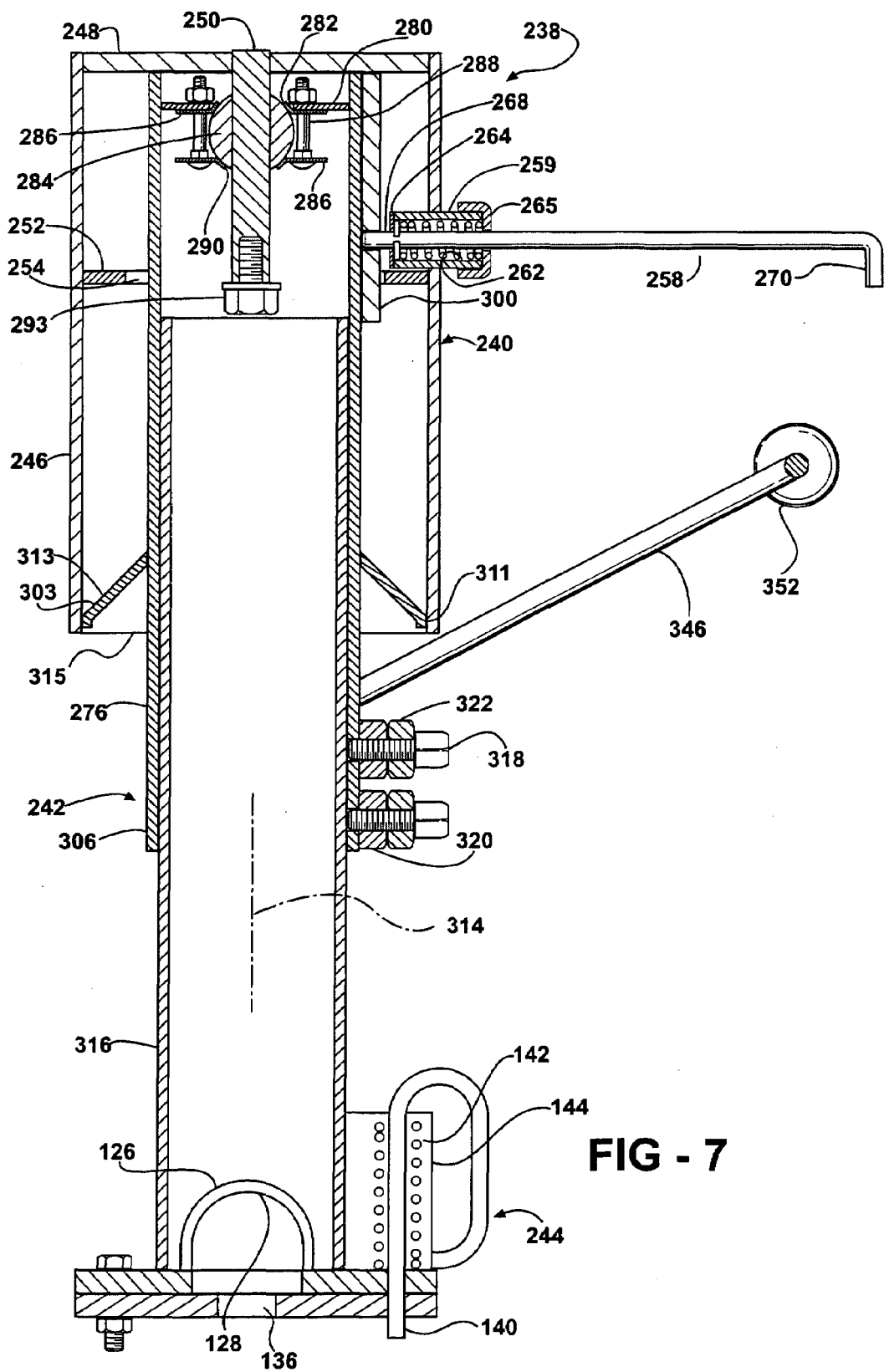
FIG. 7 is a vertical sectional view of the gooseneck trailer hitch of FIG. 6 in a raised working position.

FIGS. 5,6 and 7 discloses a gooseneck trailer hitch assembly 238 that includes a hitch mounting block assembly 240, a tower assembly 242 and a connector assembly 244. The gooseneck trailer 10, shown in FIG. 5, is the same as the trailer shown in FIG. 8 and described above. The connector assembly, 244 shown in FIG. 5 is also identical to the connector assembly 44 disclosed in FIG. 8 and described above.

The hitch mounting block 240 includes a steel block tube 246 that is fixed to the hitch support frame 20 by welding. A top plate 248 closed the top of the tube 246 and is secured to the tube. A vertical shaft 250 and is secured to the tube. A vertical shaft 250 is fixed to the top plate 258, extends downward from the plate and is coaxial with the tube 246. A plate 252 with a large central aperture 254 is fixed to the inside of the block tube 246 in a location that is lower than the lock plate 52 described above. The shaft 250 does not extend below the plate 252. A lock lever 258 extends through a spring housing tube 259 mounted in the wall of the tube 246. A coiled compression spring 262 is housed in the tube 259 and encircles the lock lever 258. A washer 264 is fixed to the lock lever 258. The spring 262 presses against the washer 264 and a cap 265 that closed the tube 259. A handle 270 is provided on an outer end of the lock lever 258.

The tower assembly 242 includes an upper tube 276. An upper ring 280 with a central aperture 282 is fixed inside the upper end of the tube 276. A steel spherical member 284 is slidably held in the aperture 282 by upper and lower flanged rings 286 that are one clamped to the ring 280 by a plurality of bolts 288. The flanged rings 286 have central apertures 290. The diameter of the spherical member 284 is larger than the diameter of the central aperture 290 through the flanged rings 286. The tension on the bolts 288 controls the force required to pivot the spherical member 284 in the flanged rings 286. A bore 292 through the center of the spherical member 284 receives the shaft 250. A bolt 293 retains the spherical member 284 which is slidable up and down on the shaft 250. The bushing 94 described above and shown in FIG. 9 is for a heavy duty hitch assembly 40. The bushing 94 can be used with the hitch shown in FIGS. 6 and 7 by increasing the length of the vertical shaft 250.

An actuate plate 300 with a slot 302 partially encircles the upper end of the tube 276. An end 268 of the lock lever 258 extends into the slot 302 to axially lock the tube 276 in an upper position relative to the tube block 246 as shown in FIG. 7. A conical member 303 is welded to an outside surface 306 of the upper tube 276. The conical member 303 has a cylindrical tube positioning surface 311 and a conical wedge surface 313. The cylindrical positioning surface 311 is coaxial with the tube axis 314. The wedge surface 313 makes sliding contact with the bottom 315 of the tube 246 during connection of the trailer 10 to a truck. The cylindrical positioning surface 311 is slightly smaller in diameter than the inside diameter of the tube 246. The single point of contact between the wedge surface 313 and the bottom edge 315 of the tube 246 and light radial movement of the conical member 303 relative to the tube 246 is acceptable for trailers 10 with a relatively light gross weight and limited use.

The lower portion of the tower assembly 242 includes a lower tube 316 that is telescopically received in the upper tube 276. Setscrews 318 screw into nuts 320 fixed to the outside surface 306 of the tube 276, through tube bores and engage the lower tube 316 to fix the length of the tower assembly 242. Lock nuts 322 maintain the length of the tower assembly 242 and keep the length of the tower assembly 242 from changing during use by locking the setscrews 318 in a tightened position. The tubes 276 and 316 can be one tube with a fixed length if the ball 124 or other connector assembly is vertically adjustable on a truck.

A joystick 346 with a handle 352 is connected to the tower assembly 242 for moving the tower relative to the spherical member 284 when the tower is lowered on the vertical shaft 250 as shown in FIGS. 5 and 6.

The connector assembly 244 has the same construction as the connector assembly 44 described above.

The gooseneck trailer 10 shown in FIGS. 8, 9 and 10 can have the fins 104 replaced by the conical member 303 shown in FIG. 6. With this change, the conical surface 313 contacts the steel ring 72 and moves the connector assembly 44 into vertical alignment with the connector ball 124. The cylindrical 311 moves into engagement with the ring 72 as the trailer is lowered into the position shown in FIG. 10. In this position, impact forces on the conical member 303, the ring 72 and other components are dampened by the hard rubber band 74 or other impact dampers described above.

Figure 1:
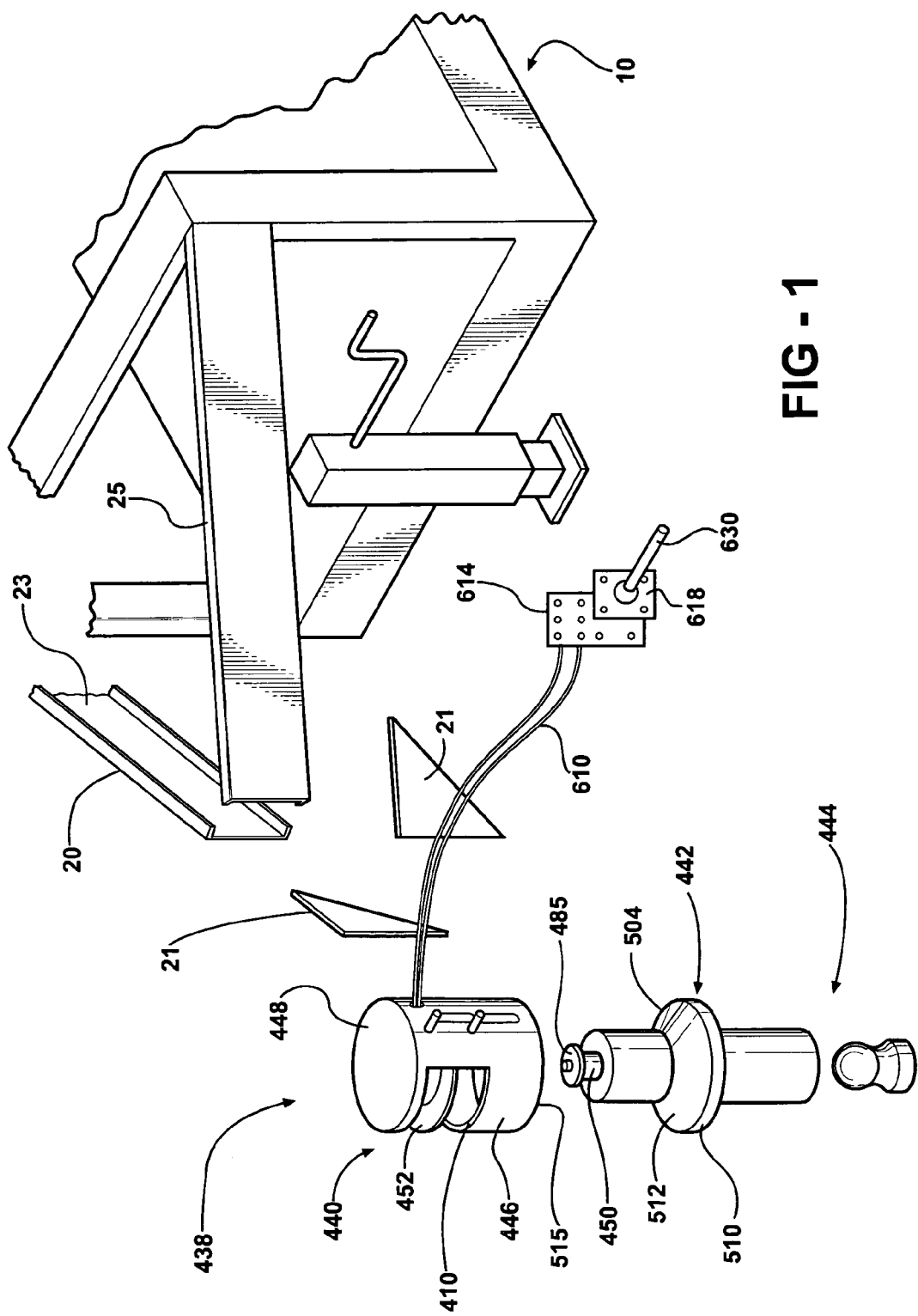
FIG. 1 is an expanded view of the gooseneck trailer hitch and a trailer with parts broken away.

FIGS. 1 through 4 disclose a gooseneck trailer hitch assembly 438 that includes a hitch mounting block assembly 440, a tower assembly 442, and a connector assembly 444. The gooseneck trailer 10, a portion of which is shown in FIG. 1 is the same as the trailers shown in FIGS. 5 and 8 and described above. The connector assembly 444 has the same construction as the connector assembly 44 described above. The hitch mounting block assembly 440 includes a steel block tube 446 that is fixed to the hitch support frame 20. Gussets 21 can be fixed to the block tube 446 and to Channel members 23 and 25 of the hitch support frame 20 to reinforce the connection between the tube 446 and the trailer 10. A top plate 448 closes the top of the tube 446. A lock plate 452 is mounted inside the tube 446 in a position below a parallel to the top plate 448. An opening 410 is provided in the wall of the tube 446 for access during assembly. A cover 412 covers the opening 410. Two parallel spaced apart slots 414 pass through the wall of the tube 446 and extend upward from the top of the lock plate 452. A lock bolt 416 has two legs 426 formed by a vertical slot in the bolt that extends from an outboard end 418 of the bolt to the vertical end 420 of the slot. A compression spring 422 in a bore 424 in the bolt 416 acts on the base of the bore and a portion of the inside wall of the tube 446 between the slots 414 to urge the bolt 416 radially inward toward the center of the tube. An elongated handle 428 is connected to an outboard end 418 of the bolt 416. A bolt cam surface 430 is provided on the inboard end of the bolt 416. A tubular housing 432 is welded to the center of the lock plate 452, extends upward from the lock plate and is coaxial with the tube. A slot 434 permits entry of the lock bolt 416 into the housing 432. The tower assembly 442 includes an upper tube 476. A first upper ring 480 with a central aperture 482 is fixed inside the upper end 508 of the tube 476. A second aperture ring 481 with a central aperture 483 is fixed inside the upper end of the tube 476 in a position spaced from and below the first aperture ring 480. A shaft 450 posses through the central apertures 482 and 483, extends out of the upper and of the upper tub 476 and is welded to the first aperture, ring 480 and the second aperture 481. The shaft 450 extends upward from the upper tube 476 and passes through a large aperture 489 through the lock plate 452. A washer 485 with an outer diameter that is slightly less than the inside diameter of the tubular housing 432 is secured to the top end of the shaft 450 by a bolt 487. The outer diameter of the washer 485 is larger than the diameter of the large aperture 489. A conical member 504 is welded to an outside surface 506 of the tube 476. The conical member 504 is spaced well below the upper end 508 of the tube 476. The conical member 504 has a cylindrical positioning surface 510 and wedge surface 512. The conical member 504 is identical to the conical member 303 described above. The radial finds 104 described above can replace the conical member 504 if desired. The wedge surface 512 makes sliding contact with the bottom 515 of the tube 446 during connection of the trailer to a truck. The cylindrical positioning surface 510 is slightly smaller in diameter than the inside diameter of tube 446. The single point contact between the wedge surface 512 and the bottom edge 515 of the tube 446 and slight radial movement of the conical member 504 relative to the tube 446 is acceptable for trailers with a relatively light gross weight and limited use.

Figure 2:
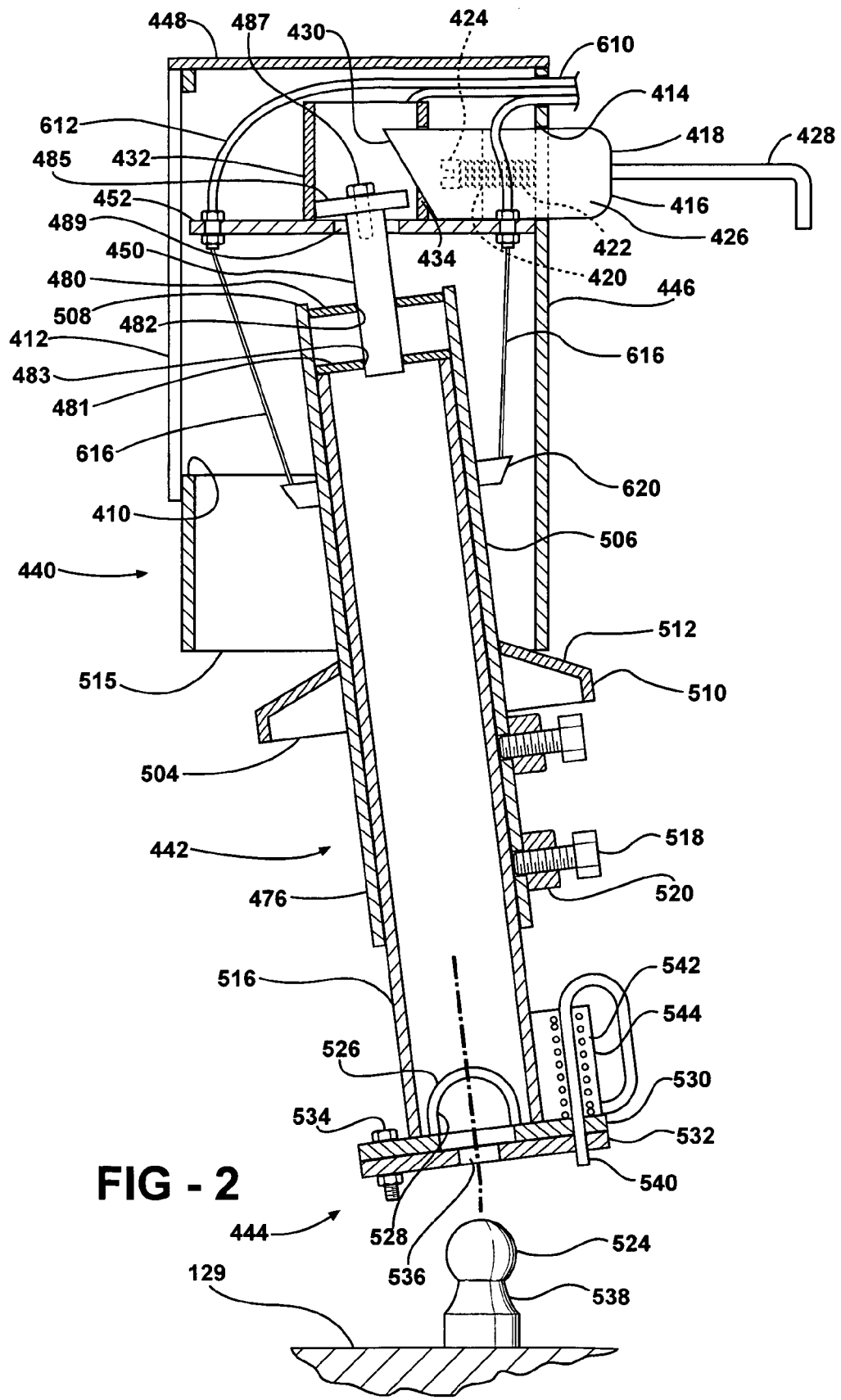
FIG. 2 is a vertical sectional view of the gooseneck trailer hitch with the mast assembly lowered and tilted to one side and in vertical alignment with a vehicle mounted ball connector.
Figure 4:
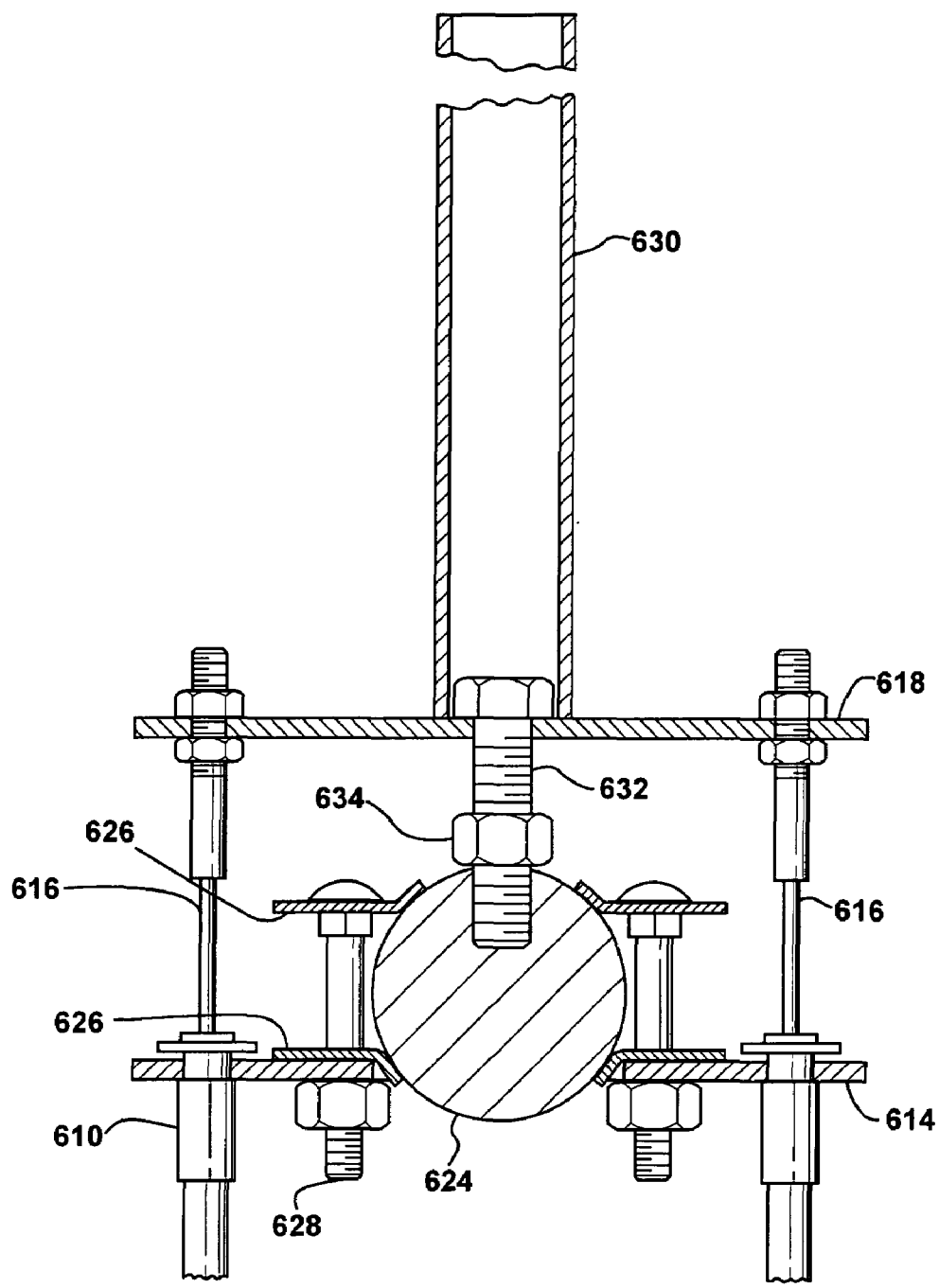
FIG. 4 is a sectional view of a remote mast assembly positioning system.

The lower portion of the tower assembly 442 includes a lower tube 516 that is telescopically received in the upper tube 476. The lower tube 516 can slide into the upper tube 476 and shorten the height of the tower assembly 442 until contact is made with the second aperture ring 481 as shown in FIGS. 2 and 3. Setscrews 518 screw into nuts 520 to fix the position of the lower tube 516 relative to the upper tube 476. The length of tower assembly 442 is adjusted by loosening the setscrews 518, sliding the lower tube 516 to a selected position relative to the upper tube 476 and then retightening the setscrews. The length of the tower assembly 442 is adjusted to accommodate the height of the hitch connector ball 524 of a truck. The height of hitch connector balls 524 vary from one truck to the next depending upon the size of the truck and the location of the connector on the truck. It is generally desirable to hold the front of the cargo carrying bed 26 and the rear of the cargo carrying bed at about the same height above a roadway when transporting cargo as explained above. The connector assembly 444 includes a hitch connector ball 524 that is clamped to a truck frame 129. The ball receiver 526 includes a semispherical recess 528 in a mounting plate 530. The mounting plate 530 is fixed to the lower end of the lower tube 516. The ball 524 is received in recess 528 of the ball receiver 526 when connecting a trailer 10 to a truck. A ball retainer plate 532 pivots about a bolt 534. A slot 536 extending through one side of the retainer plate receives the ball shank 538, and pivotal movement is stopped when the base of the slot engages the ball shank. A pin 540 is urged downward by a spring 542, in a spring housing 544, and passes through a bore through the retainer plate 532 to hold the retainer plate in a locked position. The base of the slot 536 is generally moved a short distance away from the shank 538 for the pin 540 to pass downward from the retainer plate 532. Movement of the base of the slot 536 away from the ball shank 538 insures that the retainer plate 532 leaves the ball 524 free to pivot within limits in the recess 528 while holding the ball in the recess. The connector assembly 444 is identical to the connector assemblies 44 and 244 described above. The connector assemblies are one of a number of connector assemblies that can be employed to connect a tower assembly 442 to a truck as setforth above.

Three control cable assemblies 610 are shown in FIGS. 1 through 4 for pivoting the tower assembly 442 into a position in which the recess 528 of the ball receiver 526 is in vertical alignment with a hitch connector ball 524 on a vehicle to which the trailer 10 is to be connected. Each of the control assemblies 610 includes a sheath 612 with one end anchored on the lock plate 452 and another end anchored on a controller plate 614. The controller plate 614 is fixed to the trailer 10 near the landing gear 28. The plate 614 is also in a position from which an operator can observe the ball receiver 526 and the ball 524 which is to be received by the receiver. A flexible cable 616 passes through the sheath 612. A proximal end of each cable 616 is fixed to a movable plate 618. A distal end of each cable 616 is attached to one of the radial arms 620 that extend outward from the upper tube 476. The cable 616 passes through a bore, through an arm 620. A cable stop 622 is fixed to the free end of the cable 616. When the tower assembly 442 is held in a raised position by the lock bolt 416, the cable 616 is loose and the cable stop 622 is below the arm 620. Releasing the bolt 416 lowers the tube 476 and lets the tower assembly hang from the cables 616 as shown in FIG. 2.

The movable plate 618 is attached to a spherical control ball 624. Two flange rigs 626 and three bolts 628 retain the ball 624 in a fixed location relative to the control plate 614. Tension on the bolts 628 is adjusted to permit pivotal movement of the ball 624 relative to the controller plate 614. A handle 630 is connected to the moveable plate 618. A bolt 632 is fixed to the movable plate and screws into a threaded bore in the control ball 624. A lock nut 634 holds the movable plate 618 in a fixed position relative to the control ball 624. Movement of the handle 630 moves the moveable plate 618 relative to the controller plate 614 and pulls some cables 616 and releases tension on some cables. Pulling on one or two cables 616 pivots the tower assembly 442 relative to the lock plate 452 and aligns the recess 528 with a hitch connector ball 524. The landing gear 28 then lowers the front of the trailer 10. When the connector ball 524 is locked inside the receiver recess 528 and the ground plate 36 is well above the ground, the trailer 10 can be towed by a truck. The three cables 616 and related members described above replace the joy stick 346 shown in FIG. 6. A number of other systems could also be employed to replace the joy stick.

It should be recognized that upon viewing this disclosure, one ordinarily skilled in the art would readily recognize other embodiments than those disclosed herein, with those embodiments being within the scope of the claims that follow. Accordingly, this disclosure herein is intended to be exemplary, and not limiting. The scope of the invention is defined by the claims that follow.

I claim:

1. A gooseneck trailer hitch assembly, comprising:
a hitch mounting block including a block tube with a vertical central axis adapted to be connected to a trailer hitch support frame, a top plate fixed to the block tube, a vertical shaft connected to the top plate and coaxial with the block tube, a hard rubber band mounted in a lower end of the block tube and coaxial shaft, and a steel ring mounted inside the hard rubber band in a position coaxial with and separated from the block tube;
a tower assembly including a steel spherical member slidably mounted on the vertical shaft of the block tube, an upper ring with an upper ring aperture that is smaller in diameter than the steel spherical member a flanged ring with a central ring aperture that is smaller in diameter than the steel spherical member, a plurality of bolts clamping the upper ring and the flanged ring to the steel spherical member, a tower assembly tube with an upper end that is fixed to the upper ring and wherein the tower assembly is pivotable about a sphere center and slidable vertically along the vertical shaft with the steel spherical member, and a tube positioning member fixed to the tower assembly tube and having a wedge surface that contacts the steel ring and moves the tower assembly tube toward a vertical position as the tower assembly moves toward the top plate and a tube positioning surface on the tube positioning member that is generally parallel to a tube axis and wherein the tube positioning surface engages a ring radially inner surface on the steel ring in response to movement of the tower assembly tube toward the top plate after the tube axis is generally coaxial with the vertical shaft; and
a hitch connector assembly connected to the tower assembly tube.

2. A gooseneck trailer hitch, comprising:
a block tube adapted to be connected to a trailer hitch support frame, a top plate fixed to the block tube, a vertical shaft connected to the top plate, a steel ring mounted inside the block tube, and a vibration and force damper between the block tube and the steel ring;
a tower assembly including a steel spherical member slidably mounted on the vertical shaft, an upper ring and a flanged ring clamped to the upper ring and the steel spherical member, a tower assembly tube upper end fixed to the upper ring and wherein the tower assembly is pivotable about a sphere center and slidable vertically along the vertical shaft with the steel spherical member, and a tube positioning member fixed to the tower assembly tube and having a wedge surface that contacts the steel ring and moves the tower assembly tube toward a vertical position as the tower assembly moves toward the top plate and a tube positioning surface on the tube positioning member that engages the steel ring in response to movement of the tower assembly tube toward the top plate after the tower assembly tube reaches the vertical position; and
a hitch connector assembly connected to the tower assembly tube.

3. A gooseneck trailer hitch, as set forth in claim 2, wherein the tube positioning member includes a positioning member conical portion that includes the wedge surface.

4. A gooseneck trailer hitch, as set forth in claim 2, wherein the tube positioning member includes a cylindrical portion that includes the tube positioning surface.

5. A gooseneck trailer hitch, as set forth in claim 2, wherein the tube positioning member includes a plurality of fins extending radially outward from the tower assembly tube and each of the fins includes the wedge surface.

6. A gooseneck trailer hitch, as set forth in claim 2, wherein the tube positioning member includes a plurality of fins extending radially outward from the tower assembly and each of the fins includes the tube positioning surface.

7. A gooseneck trailer hitch, as set forth in claim 2, including a lock member attached to the block tube that engages and holds the tower assembly in a working position when the steel spherical member is at an upper most position on the vertical shaft and the tube positioning surface engages the steel ring.

8. A gooseneck trailer hitch, as set forth in claim 2, wherein the vibration and force damper is a hard rubber ring.

9. A gooseneck trailer hitch, comprising;
a block tube adapted to be connected to a trailer hitch support frame, a vertical shaft coaxial with the block tube and having a shaft upper end connected to a top end of the block tube, a steel ring mounted inside a block tube lower end, and a vibration and force damper between the block tube and the steel ring;
a tower assembly including a steel spherical member slidably mounted on the vertical shaft, a pair of flanged rings clamped to and slidabiliy engaging the steel spherical member, a tower assembly tube having a tower assembly tube upper end fixed to one of the pair of the flanged rings and wherein the tower assembly tube is pivotable about a sphere center and slidable vertically along the vertical shaft with the steel spherical member, and a tube positioning member fixed to the tower assembly tube and having a wedge surface that contacts the steel ring and moves the tower assembly tube toward a vertical position as the tower assembly tube moves toward the top end of the block tube and a tube positioning surface on the tube positioning member that engages the steel ring in response to movement of the tower assembly tube toward the top end of the block after the tower assembly tube reaches the vertical position; and a hitch connector assembly connected to a tower assembly tube lower end of the tower assembly tube.

10. A gooseneck trailer hitch, as set forth in claim 9, wherein the vibration and force damper between the block tube and the steel ring is a hard rubber ring.

* * * * *